Oct. 4, 1960 J. E. ROUSE 2,955,239
MAGNETIC HOLDING DEVICE
Filed March 12, 1958 4 Sheets-Sheet 1
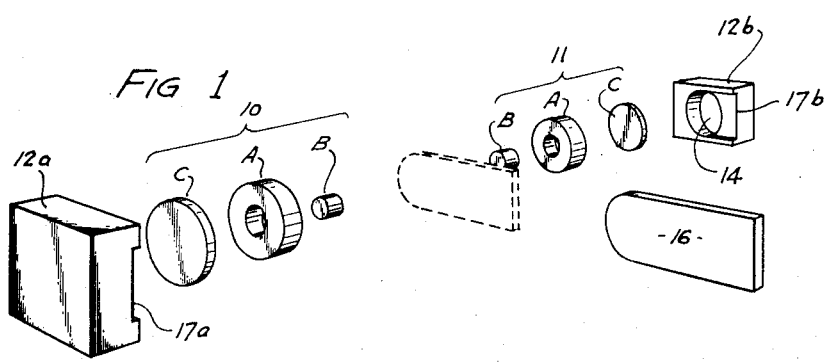
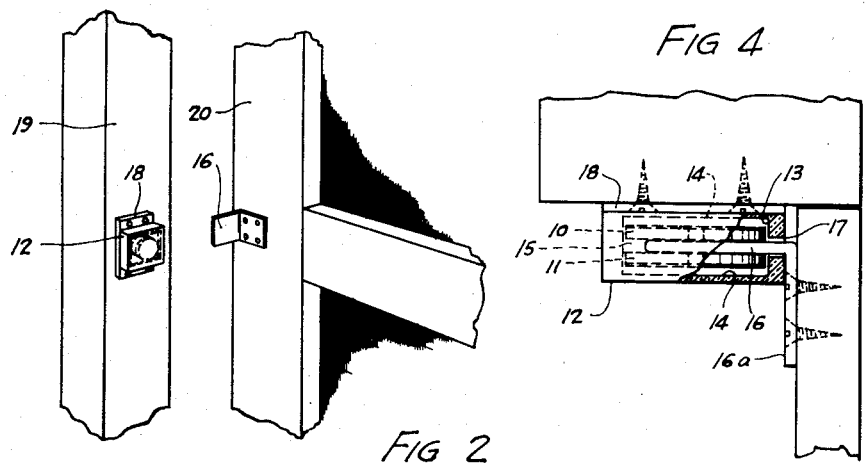
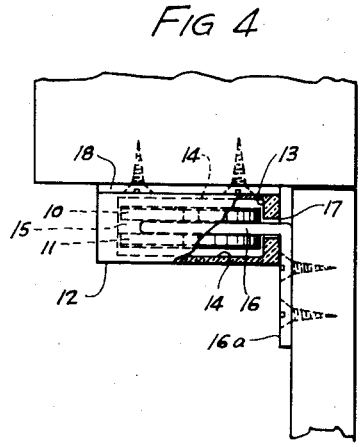
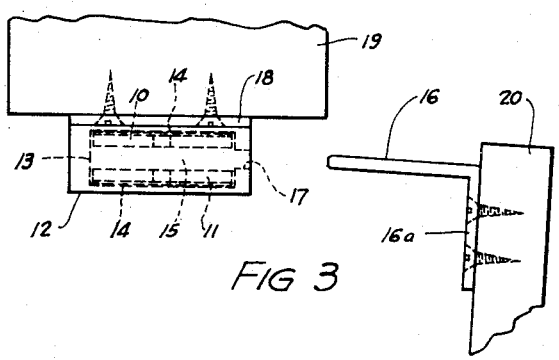
INVENTOR
John E. Rouse
BY
ATTORNEY Oct. 4, 1960     J. E. ROUSE     2,955,239
MAGNETIC HOLDING DEVICE Filed March 12, 1958     4 Sheets-Sheet 2

INVENTOR
John E. Rouse
BY
Watson, Cole, Grindle & Watson
ATTORNEY

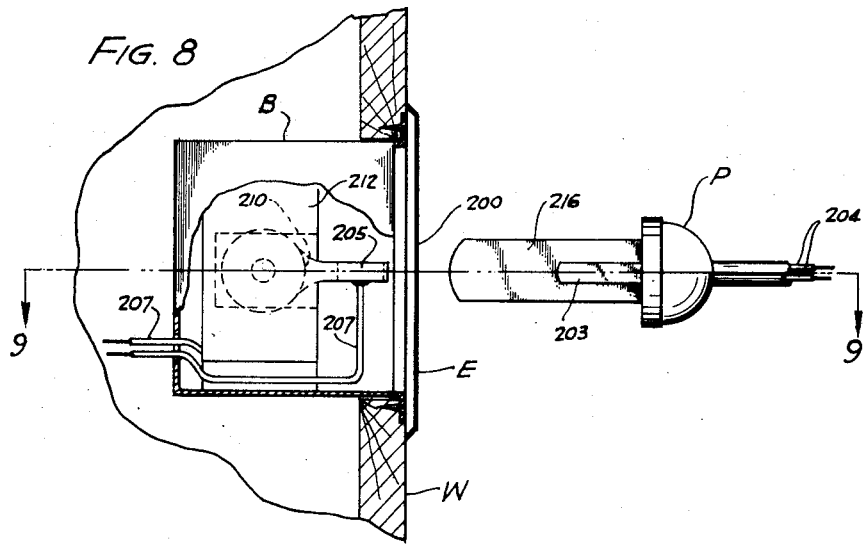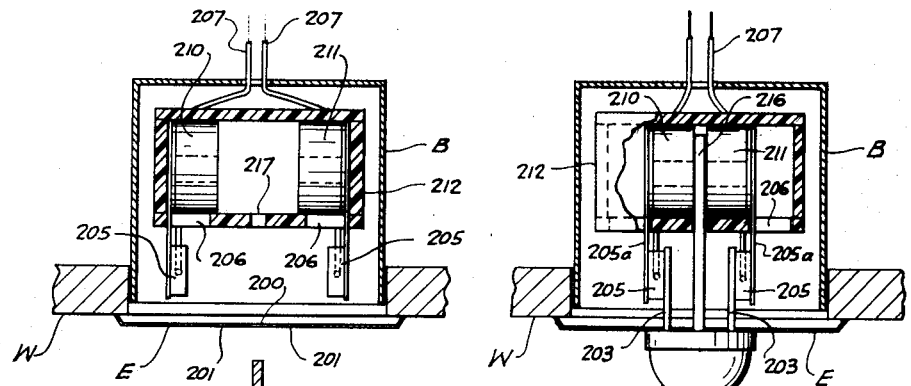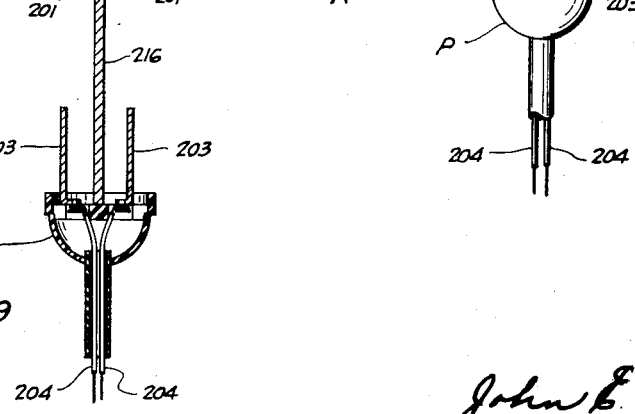

Oct. 4, 1960     J. E. ROUSE     2,955,239
MAGNETIC HOLDING DEVICE
Filed March 12, 1958     4 Sheets-Sheet 4
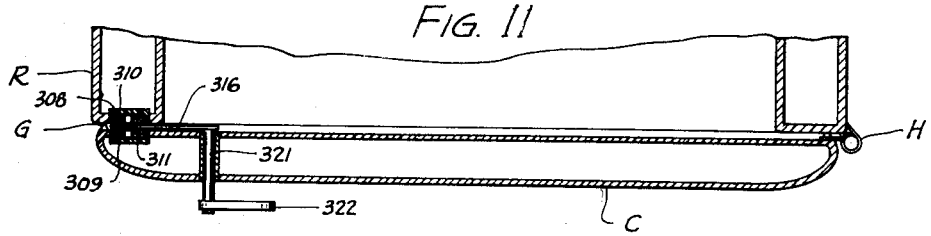
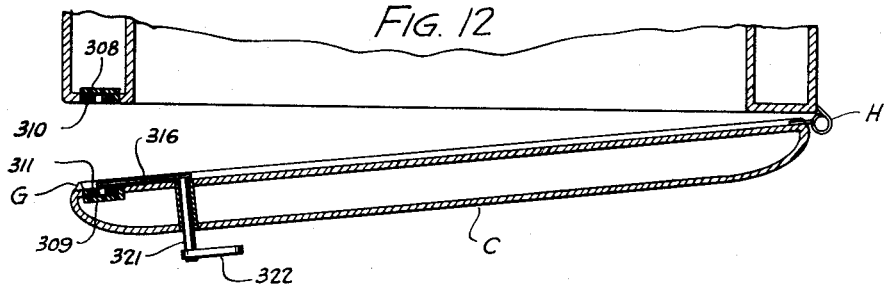
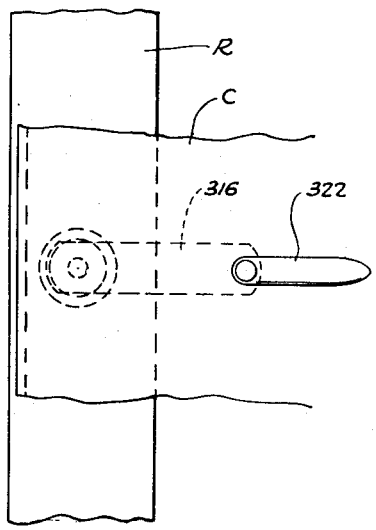
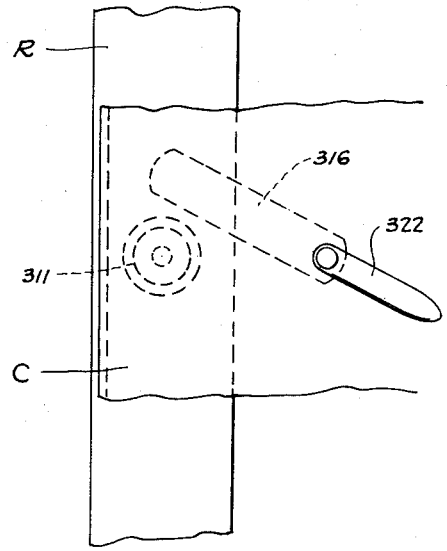
INVENTOR
John E. Rouse
BY Watson, Cole, Grindle & Watson
ATTORNEY

United States Patent Office 2,955,239
Patented Oct. 4, 1960

2,955,239

MAGNETIC HOLDING DEVICE

John E. Rouse, Norfolk, Va., assignor to Rouse Enterprises, Inc., Richmond, Va., a corporation of Virginia Filed Mar. 12, 1958, Ser. No. 720,995

20 Claims. (Cl. 317—159)

This invention involves an assembly of magnets arranged in novel cooperative relationship and capable of a wide variety of useful applications as a holding device and/or movement-cushioning or dampening device, as well as an actuating device for imparting movement to various relatively movable parts. The invention is believed to be capable of utility in a large number of fields, some as yet unexplored.

The invention is predicated on the realization that a pair of magnets, when guided for movement toward and away from each other with their opposed confronting faces of similar magnetic polarity, will tend to magnetically repulse each other in accordance with well known principles. It has been discovered that the magnets, when arranged in this manner, may be caused by magnetic forces to move toward each other by insertion between them of an armature of magnetic material which serves to mutually attract the two magnets into engagement with its opposite sides.

Several beneficial results flow from this cooperative relationship. Among others is that the resulting frictional engagement between the magnets and the armature will increase progressively as the armature is inserted between the magnets until the opposed confronting faces of the magnets contact the armature throughout their entire areas. Thus the magnets may be utilized to impose a progressively increasing dampening force on the inserted armature and thereafter, if the armature is brought to rest between them, will serve to frictionally yieldably maintain the armature in its position of rest.

By virtue of the foregoing properties it has been found that the invention is especially well adapted for use in such fields as door cushioning devices and holders, knives or tool holders and the like.

It will be further apparent that the relative movement of the magnets resulting from the insertion therebetween and/or withdrawal of the armature may be utilized to actuate various mechanisms. For instance, in accordance with one embodiment of the invention, such movement may be utilized to open and close cooperaing electrical contacts as employed, for example, in an electrical plug and socket type electric coupling.

In the latter application the frictional holding engagement between the magnets and the armature also may be utilized to advantage to positively secure the plug in its operative position while the magnets exert a constant force to maintain the cooperating electrical contacts in engagement at all times. Moreover, the spreading of the magnets incident to withdrawal of the armature may be utilized also to cause such relative movement of the socket contacts as will take them out of registry with the openings in the wall plate or escutcheon through which the contacts or prongs of the plug member are inserted, thereby reducing the danger normally arising through the possibility of insertion through said openings of a pin or other metallic object by a child.

Also, the control of the magnetic forces to produce movement of the magnets toward or away from each other at will by means of the armature may be made use of in a wide number of fields and for a wide number of purposes, whereby both the said attraction and repulsion may accomplish some useful purpose. This general application is exemplified, for instance, in a refrigerator door latching mechanism, wherein one of the magnets may be carried by the door and the other by the refrigerator cabinet adjacent the door opening, while the armature may be guided in any suitable manner on either the door or the cabinet structure for movement between these magnets. Thus, when the armature is inserted between the magnets, the coaction between them and the armature will be such as to magnetically retain the door in closed position, while withdrawal of the armature and the resulting repulsion forces between the magnets will result in a positive opening force applied to the door.

The foregoing specific applications of the invention have been illustrated in the accompanying drawings merely by way of exemplication of the invention and as conveying at least a general idea as to its many possible fields of utility. It is believed that these particular exemplifications will amply illustrate the rather broad scope of the present inventive concept and will also disclose various specific novel features and arrangements incident to the particular exemplifications.

In the accompanying drawings

Fig. 1 represents an exploded diagrammatic view of the preferred assembly of magnets as used in several embodiments of the invention;

Fig. 2 represents a fragmentary perspective view of portions of a door and door frame having the invention applied thereto for use as a combined door cushioning device and yieldable latch or holding means;

Fig. 3 is an enlarged plan view of the structure shown in Fig. 2 with the door shown as it approaches completely closed position;

Fig. 4 is a view similar to Fig. 3 but showing the door in fully closed position;

Fig. 8 is a fragmentary cross-sectional view through a building wall illustrating the manner in which the invention may be incorporated in an electrical plug and socket type coupling, the plug being shown in elevation as it appears just prior to insertion in the socket;

Fig. 9 is a sectional view on the line 9—9 of Fig. 8, looking in the direction of the arrows;

Fig. 10 is a view similar to Fig. 9 but showing the positions of the parts when the plug is fully inserted into the socket;

Figure 5:
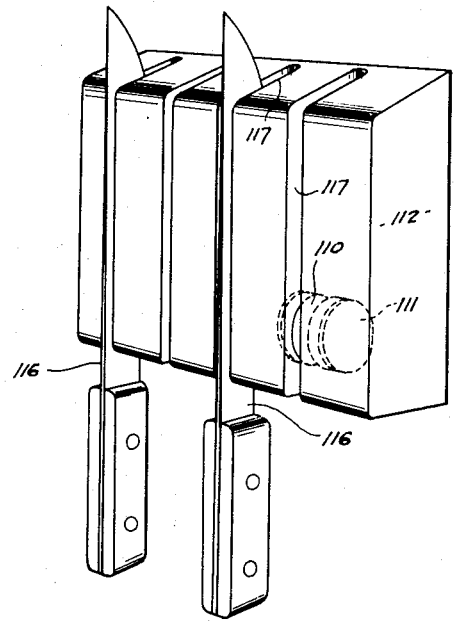
Fig. 5 is a perspective view of a further embodiment of the invention wherein same is embodied in the form of a magnetic knife holder or rack having knives operatively positioned therein.

Fig. 11 constitutes a horizontal plan section through a more or less conventional refrigerator door and its associated cabinet structure, the door being shown in fully closed position;

Fig. 12 is a view similar to Fig. 11 but with the door or closure element in open position;

Fig. 13 is a fragmentary front elevation of the structure shown in Fig. 11 showing the relative positions of the armature and magnets in the closed position of the door; and Fig. 14 is a view similar to Fig. 13 showing the position of the armature as utilized for opening the door as in Fig. 12.

Referring now in detail to the accompanying drawings, the structure shown in Fig. 1 broadly exemplifies the assembly of magnets and cooperating armature as utilized in Figures 2, 3 and 4. It will be seen that there are provided a pair of similar magnets designated 10 and 11, respectively, in their entireties. These magnets are of the permanent type and are respectively disposed for relative movement in aligned relation in supporting and guiding means exemplified by a housing 12. The housing defines a guide bore or chamber 13 which slidably receives the two magnets 10 and 11.

The magnets 10 and 11 may constitute permanent magnets of any usual or known type and it is essential only that they be disposed and guided for relative movement toward and away from each other in any suitable manner and maintained with their confronting faces of similar magnetic polarity, whereby these magnets normally will exert a magnetic repulsion force on each other. The extent of the separating movement of these magnets 10 and 11 responsive to the repulsion force is limited in the present embodiment by engagement of the respective magnets with suitable limit stops such as formed by the relatively opposed blind ends 14 of their guide bore or cavity 13. The spacing of these limit stops 13 will be such as to permit the normal spacing apart of the magnets 10 and 11 responsive to their mutual repelling action to leave an air gap or space 15 between them, as illustrated in Figure 3. Thus an article or armature 16 of magnetic material may be readily inserted between them, as in Figure 4, to mutually attract the two magnets into operative magnetic and frictional engagement with the opposite sides of the armature 16.

Although as above mentioned the magnets 10 and 11 may constitute any usual or conventional permanent magnets, it will be found desirable in most cases to utilize magnets of as great strength as possible. To this end, throughout the drawings the magnets have all been exemplified as of composite construction. Thus, as shown diagrammatically in Fig. 1, each such magnet comprises an annular magnetized member A having axially directed poles. Such member may be of known ceramic type, such as generally disclosed in the Scholten U.S. Patent 2,812,203 of November 5, 1957. The strength of each of the magnets 10, 11 is increased in accordance with known theory by inclusion in the opening of its member A of a core piece B of magnetic material and also preferably by the application of a pole piece in the form of a disc C, also of magnetic material equal in diameter to the magnet element A and extending across the pole face of the magnet element A remote from the other said cooperating magnet.

Since the magnets 10 and 11 in this form of the invention are of exteriorly cylindrical conformation their cooperating guide recess or bore 13 in the supporting housing or means 12 will similarly be of cylindrical shape proportioned to permit free axial sliding movement of the magnets relative to each other, while preventing them from rotating to present their unlike poles toward each other.

In order to permit insertion of the armature 16 between the relatively spaced magnets 10 and 11, the housing 12 is formed to provide a suitable slot 17 opening into the bore 16 medially between the ends 15 thereof and in alignment with the space or air gap 15 normally existing between the magnets. As shown in Fig. 1, the housing may be formed of complementary sections 12a and 12b of non-magnetic material, and secured together by adhesives or in other known manner after the magnets are positioned therein. The slot 22 may be jointly defined by complementary recesses 17a, 17b in the opposed sections of the housing 12.

In the application of the foregoing structure to a door for use as a door cushioning and holding means as illustrated in Figs. 2, 3 and 4, the housing 12 will preferably be fixed on a mounting plate 18 which is secured by screws or otherwise on to the door frame 19 for cooperation with the armature 16 which, in this application, is shown as being carried by the door 20, it being understood that the latter will be hinged along its edge remote from the armature 16 for swinging movement of its free edge toward and away from the housing 12. The armature 16 is so fixed by means of its bore 16a on the inner face of the door 20 adjacent its free edge as to be accurately guided by the swinging movement of the door for insertion into and retraction from the slot 15 and thus for movement in a path extending between the two magnets 10 and 11.

In the operation of this embodiment of the invention, it will be readily apparent that as long as the door remains open the two magnets 10 and 11 will mutually repel each other, and their repulsive action will thus maintain them in predetermined spaced relation in engagement with the end walls 14 which constitute the means for limiting their separation movement responsive to said repulsive action. As thus positioned it will be seen that the space 15 between the two magnets will be greater than the corresponding proportion of the armature 16 to initially receive the armature with a substantial degree of clearance incident to closing of the door. However, once the armature 20 has moved through slot 17 and between the magnets sufficiently that the forces attracting the magnets to the armature exceed the repulsive forces between the magnets, the magnets will be magnetically attracted into engagement with the opposite sides of the armature. The initial such engagement will be comparatively light and obviously will increase progressively during continued insertion of the armature, to a maximum which will be attained when the armature has moved completely across the faces of the magnets.

Thus it will be apparent that during closing movement of the door the magnets will exert a progressively increasing frictional braking action on the armature which in turn will be transmitted to the door to prevent or minimize slamming thereof. And once the door is in fully closed position the frictional engagement between the magnets and the armature will serve to yieldably retain it in that position, but without unduly interfering with subsequent opening thereof.

Considering the housing 12 and its contents from a broad standpoint, and irrespective of its specific application to a door, it will be apparent that the slot 17 is disposed to facilitate its insertion between the magnets so that it may function as a guide means for any armature 10 and 11. This ability is employed in the embodiment hereinafter described.

Figure 6:
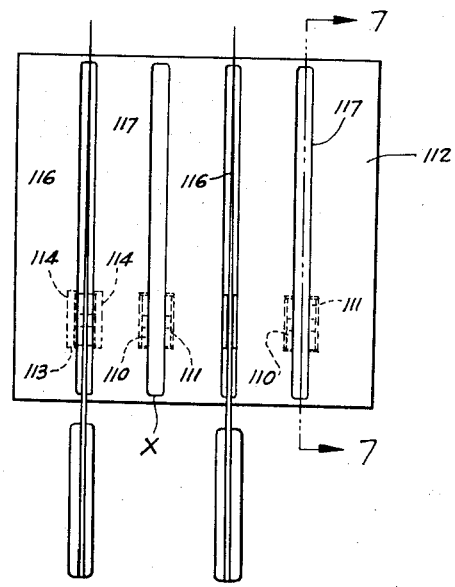
Fig. 6 is a front elevation of the structure shown in Fig. 5.
Figure 7:
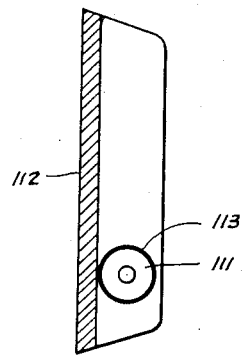
Fig. 7 is a sectional view on the line 7—7 of Fig. 6.

In the embodiment of the invention illustrated in Figures 5, 6 and 7, a plurality of the magnet assemblies such as aforementioned are applied to a knife rack for supporting a plurality of knives or the like in position on a wall surface. In this modification the parts which correspond to those of the first embodiment are designated by similar reference characters which, however, are prefixed by the numeral "1" in each case.

Thus the body or housing 112 of the knife rack is, in this instance, adapted to be supported on a vertical wall surface or the like and is formed with a plurality of relatively parallel guide slots 117 for guiding reception of the knife blades 116, which, being of magnetic material, function as the armatures for the several magnetic assemblies. The body of the rack 112 will, of course, be formed of any suitable non-magnetic material such as wood, plastic, or the like.

On opposite sides of each of the slots 117 are disposed axially aligned blind-ended cylindrical guide bore segments 113, which in reality form complementary halves of a cylindrical guide recess for the respective magnets 110 and 111. It will be seen that the magnets are supported in these bores on opposite sides of the slot 117 with their opposed confronting faces of similar polarity, as in all embodiments of the invention, so that they will normally tend to repel each other to the extent permitted by the blind ends of the bore 113 which serve as limit stops as in the preceding embodiment.

Accordingly, with this disposition of the magnets, it will be seen that if a knife blade 116 is inserted into any of the slots 117 and guided thereby between the two magnets 110 and 111, these magnets will be mutually attracted into frictional holding engagement with opposite sides of the knife blade 116 to positively support it while nevertheless permitting its easy withdrawal at any time in obvious manner.

It will be apparent that if desired the confronting faces of the respective magnets 110 and 11 of each pair may be either roughened or coated with suitable abrasive material whereby their frictional engagement with the knife blade may cause them to function as knife sharpeners as the knife is drawn between them.

In the embodiment of the invention illustrated in Figs. 8 to 10, inclusive, of the drawings the invention is utilized in an electrical wall socket coupling structure, in which the various parts corresponding to those of the first embodiment are hereinafter designated by similar reference characters prefixed in each case by the numeral "2."

In this modification there is shown a more or less conventional open-fronted box-like electrical wall receptacle B mounted in usual manner in an opening in a usual building wall W with its open end flush with the wall surface. The open end or front of the receptacle is shown as covered by an escutcheon or plate E having openings 200 and 201—201 therethrough positioned and proportioned to receive an armature 216 carried by an electrical plug P having its contacts or prongs 203 respectively located on opposite sides of the armature 216. These prongs 203 are electrically connected to suitable conductor wires 204—204 respectively in usual manner.

The magnets 210 and 211 are slidably disposed in a housing 212 of non-magnetic and electrically non-conductive material fixed within the receptacle B, these magnets being disposed for relative movement toward and away from each other as in preceding embodiments. Also, as in the embodiments heretofore described, the opposed confronting faces of the respective magnets 210 and 211 are of similar polarity so that the magnets repel each other except when the armature 216 is inserted between them.

Contact pieces 205—205 are carried on the relatively remote ends of the respective magnets for movement with the magnets. These contact pieces project from the housing and are movable in openings 206 respectively. It will be noted that the contact pieces 206 project forwardly in parallel relation toward the cover plate E and are connected in an electrical circuit by the flexible conductors 207—207 which permit free movement of these parts.

Formed in the front of the housing 212 is a guide slot 217 corresponding to that of the first embodiment and in registry with the opening 200 in the cover plate E for guiding reception of the armature 216.

Normally, when the plug P is removed from the socket, as in Figs. 8 and 9, the repulsive action of the magnets and the resulting separation of the contacts 205 will position the contacts out of registry with and on relatively remote sides of the respective slots 201 in the cover plate E. This contributes to the safety of the device in obvious manner, since it will make it extremely unlikely that a metallic object such as a pin or a knife blade inserted by a young child would engage either of the contacts.

It will be apparent that the plug may be readily inserted into the socket to couple the conductors 204 to the conductors 207. This is accomplished by merely inserting the armature 216 through the relatively aligned slots 200 and 217 and between the magnets 210 and 211 to the position indicated in Fig. 10.

In this connection the contact prongs 203 are of such length relative to the armature 216 that the prongs 203 will normally be positioned between the contacts 205 before the armature 216 is inserted between the magnets 210 and 211 sufficiently to attract them toward each other. Subsequently, when such attraction of the magnets occurs this not only will move the magnets into frictional retaining engagement with opposite sides of the armature, as shown in Fig. 10, but also the contacts 205 which move with the magnets will at the same time be brought into electrically conductive engagement with the prongs 203 of the plug.

The supporting arm portions 205a of the contacts 205 which extend from the respective magnets through the openings 206 are preferably of a non-conductive material and also preferably will be somewhat resilient or flexible in nature to thus produce a firm engagement between the contacts 205 and 203 respectively, while at the same time ensuring firm frictional engagement between the magnets 210 and 211 and the armature 216, all without the necessity for excessive precision in the positioning of these parts. Moreover, this will permit the proper contact between the parts even though one or the other of the prongs 203 may become accidently bent somewhat out of alignment as sometimes occurs.

The operation of the socket and plug arrangement as thus described will be seen to be similar to that of a switch under the control of the magnets and armature, inasmuch as the movement of the magnets and contact pieces 205 under the control of the armature 216 results in the circuit closing engagement between the respective pairs of contacts 203 and 205. Similarly, withdrawal of the plug and the ensuing repulsive forces tend to spread the magnets apart before the plug is completely withdrawn and thereby open the circuit through each cooperating pair of contacts 203, 205.

In the final embodiment of the invention, as shown in Figs. 11 to 14, inclusive, the invention is shown as incorporated in a refrigerator door latching mechanism. In this embodiment, as in preceding modifications, the parts which correspond to those of the first embodiment are designated by similar reference characters which, in this case, are preceded by the numeral "3."

The refrigerator itself is shown only in part in the drawings, it being understood that the refrigerator will be of any conventional construction incorporating a usual cabinet R arranged at the front to define an opening for access to its interior, this opening being normally closed by a door or cover C which is hinged to the cabinet adjacent one vertical edge of the opening as at H.

Fixed in the front of the cabinet adjacent the free-swinging edge of the door C is a socket 308 of non-magnetic material within which is fixedly retained the magnet 310. A similar non-magnetic socket 309 fixed within the free edge portion of the door C fixedly retains the magnet 311. The two magnets are so positioned that as the door is brought into closed position as shown in Fig. 11 the two magnets will be in relatively opposed registering relation with their opposed confronting faces of similar polarity to normally exert a mutual repelling action. In the closed position of the door C these magnets 310 and 311 will normally be maintained in spaced relation by engagement between the door gasket or sill G and the cooperating surface of the cabinet R engaged thereby.

As thus arranged it may be seen that an armature of magnetic material may be inserted between the magnets 310 and 311 whereby the attraction of such magnets to the armature will maintain the door closed, while withdrawal of the armature from between the magnets will permit their mutual repelling force to be applied in usual manner to exert an opening force on the door C. The armature may, of course, be mounted on either the door or the cabinet for movement between the magnets in any suitable manner. In the instant embodiment, however, the armature 316 is shown as mounted on one end of a shaft 321 journalled completely through the door, the arrangement being such that the armature 316 is swingable incident to rotation of the shaft for movement in a plane extending between the magnets 310 and 311. The armature in this instance is controlled through a handle 322 on the outer end of the shaft 321 to permit easy manual manipulation in the manner of a usual door handle.

It will be noted that in this embodiment the housing such as employed in previous embodiments for guiding the magnets in their relative movement is omitted. However, the same guiding function is taken over in this present embodiment by the door C and the cabinet R itself, which will be seen to mutually support and guide the magnets 310 and 311 toward and away from each other while maintaining their faces of similar polarity in opposed relation as long as the magnets are in proximity to each other.

It will further be seen that in the closed position of the door C its inertia and also the friction in its hinge H will oppose any movement of the magnets under the influence of their repulsive force and thus will serve in a manner analogous to the limit stops of the earlier embodiments.

In this application I have shown and described several specific embodiments of the invention, each of which illustrate a particular application of the invention and also discloses certain incidental novel features. However, it is to be understood that these specific embodiments are merely illustrative of a large number of possible fields of use of the invention. Obviously the invention may be adapted to use in various such other fields and its individual features may be modified various ways, all without departing from the inventive concept herein disclosed. Accordingly, the accompanying drawings and description are to be regarded as merely illustrative in nature and not as restrictive.

I claim:

1. A magnetic device of the character described comprising a pair of permanent magnets in spaced relation with opposed confronting parallel faces of similar magnetic polarity, whereby said magnets will normally tend to repel each other, nonmagnetic means supporting and guiding said magnets for relative movement in predetermined paths toward and away from each other while maintaining them with their said confronting faces of similar magnetic polarity in opposed relation, whereby an article of magnetic material when inserted between said relatively spaced magnets will attract both said magnets toward each other and into engagement with opposite sides of said article.

2. An assembly of magnets in spaced relation with opposed confronting faces of similar magnetic polarity, whereby said magnets will normally repel each other, nonmagnetic guide mechanism supporting the said magnets for relative movement toward and away from each other while maintaining them with their said confronting faces in opposed relation, means normally opposing the relative movement of said magnets away from each other, in a predetermined relatively spaced condition of said magnets, said guide mechanism being constructed to leave an opening in registry with the space between said magnets for insertion therebetween of an armature of magnetic material, whereby said armature will exert an attractive force on both said magnets.

3. An assembly of magnets comprising a pair of relatively spaced permanent magnets having faces of similar magnetic polarity in opposed confronting relation, nonmagnetic means supporting said magnets for relative movement toward and away from each other while maintaining the opposed relation of their said faces, whereby said magnets will normally repel each other, and means normally opposing the separation of said magnets beyond a predetermined extent due to magnetic repulsion, said nonmagnetic means being constructed to leave an opening in registry with the space between said magnets for the insertion of an armature of magnetic material.

4. A magnetic holding device comprising a pair of permanent magnets, nonmagnetic means supporting said magnets for relative movement toward and away from each other in relative alignment with their like poles facing each other while limiting their separation due to magnetic repulsion, said nonmagnetic means being constructed to leave an opening in registry with the space between said magnets for the insertion of an armature of magnetic material.

5. A magnetic device as defined in claim 1, wherein said supporting and guiding means for the magnets comprises a housing of non-magnetic material slidably receiving and guiding said magnets as aforesaid, said housing being formed with a guide slot opening medially between and directed transversely to the relative movement of said magnets, to guide said article medially between the relatively spaced magnets.

6. A magnetic device as defined in claim 1, wherein said supporting and guiding means for the magnets comprises a housing of non-magnetic material slidably receiving and guiding said magnets as aforesaid and including limit stops positioned for engagement with the respective magnets to limit the extent of their separation movement due to magnetic repulsion, said housing being formed to define an opening in registry with the space between said magnets.

7. An assembly of magnets as defined in claim 3, wherein the respective magnets each include an annular member having axially directed poles.

8. An assembly of magnets as defined in claim 7, wherein each said magnet is of composite structure, including an axial core piece of magnetic material concentrically disposed therein, and a disc-like pole piece of magnetic material disposed coaxially across its pole remote from said other magnet, each said magnet being maintained in assembled relation by magnetic forces for movement as a unit.

9. An assembly of magnets as defined in claim 3, wherein the respective magnets are externally of cylindrical configuration having axially directed poles, and are relatively movable along their axes.

10. The combination defined in claim 9 in which said nonmagnetic means supporting the magnets for relative movement defines relatively opposed axially aligned cylindrical bore sections opening toward each other and blind at their relatively remote ends, said bore sections slidably receiving and guiding the respective magnets in their relative movement, the said opening left by said nonmagnetic means being in the form of a guide slot opening transversely to the movement of said magnets at an axial location substantially equidistant from the blind ends of the bores, to guide an armature of magnetic material medially between said magnets.

11. A magnetic device as defined in claim 3, including an armature of magnetic material, and a supporting element guiding said armature for relative movement to said magnets in a predetermined path extending between said magnets.

12. A magnetic device as defined in claim 11, including a rigid element defining an opening, and a closure element hinged to said rigid element for movement into and from covering relation with respect to said opening, one of said elements constituting the said supporting element for said armature, and said other element constituting part of the supporting means for said magnets, whereby said armature when guided between said magnets incident to angular movement of said closure element about its hinge will be frictionally engaged and braked by said magnets and thereafter retained in a predetermined angular position.

13. The combination of claim 12 including a plurality of pairs of said magnets supported by said supporting means as aforesaid in successive positions along the path of relative movement of said armature for successive cooperation therewith.

14. An assembly as defined in claim 2 wherein said opening comprises a rectilinear slot in said guide mechanism transversely to the relative movement of said magnets for reception of an armature in the form of a knife blade, whereby said magnets will frictionally engage and retain the knife blade in said slot.

15. An assembly as defined in claim 14, in which the opposed confronting faces of said magnets comprise abrasive sharpening surfaces.

16. An assembly of magnets as defined in claim 3, including first electrical contacts carried by the respective magnets for movement therewith, an armature of magnetic material insertible between said magnets, and further electrical contacts fixedly supported on opposite sides of said armature in spaced relation parallel to the movement of said first contacts, but to a lesser extent than the spacing of said first contacts when their respective magnets are spaced to said predetermined extent, said further contacts being positioned for engagement by the said first contacts incident to insertion of the armature between said magnets, whereby the ensuing engagement between the respective first and second contacts will close an electrical circuit including both sets of contacts.

17. An assembly of magnets as defined in claim 16, wherein said first electrical contacts and said second electrical contacts are so relatively proportioned and located relative to the armature as to position said second contacts between and in the path of said first contacts during the insertion of said armature before said insertion has progressed to a point to attract said magnets toward the armature.

18. An assembly of magnets as defined in claim 2, including a rigid element defining an opening, and a closure element hinged to said rigid element for swinging movement to and from covering relation with said opening, said magnets being carried respectively by said elements, and in said predetermined spaced relation in the closed position of said closure element, said armature being movably mounted on one of said elements for selective insertion between and withdrawal from said magnets, the insertion of said armature and its attraction of said magnets tending to maintain said closure element in covering relation with the opening, and the repulsive forces between said magnets tending to open said closure element.

19. The combination defined in claim 18, in which the inertia of said closure element and its frictional resistance to opening movement constitute said means opposing the relative movement of the magnets.

20. The combination of claim 19, including a shaft rotatably journalled through said closure element, said armature being carried by said shaft on one side of the closure element for angular insertion and withdrawal movement, and a manual operating handle fixed on said shaft on the other side of said closure element.

References Cited in the file of this patent

UNITED STATES PATENTS

| | | |
|---|---|---|
| 2,121,301 | Ratcliffe | June 21, 1938 |
| 2,812,203 | Scholten | Nov. 5, 1957 |
| 2,853,869 | Cluwen | Sept. 30, 1958 |